United States Patent Office 2,942,864
Patented June 28, 1960

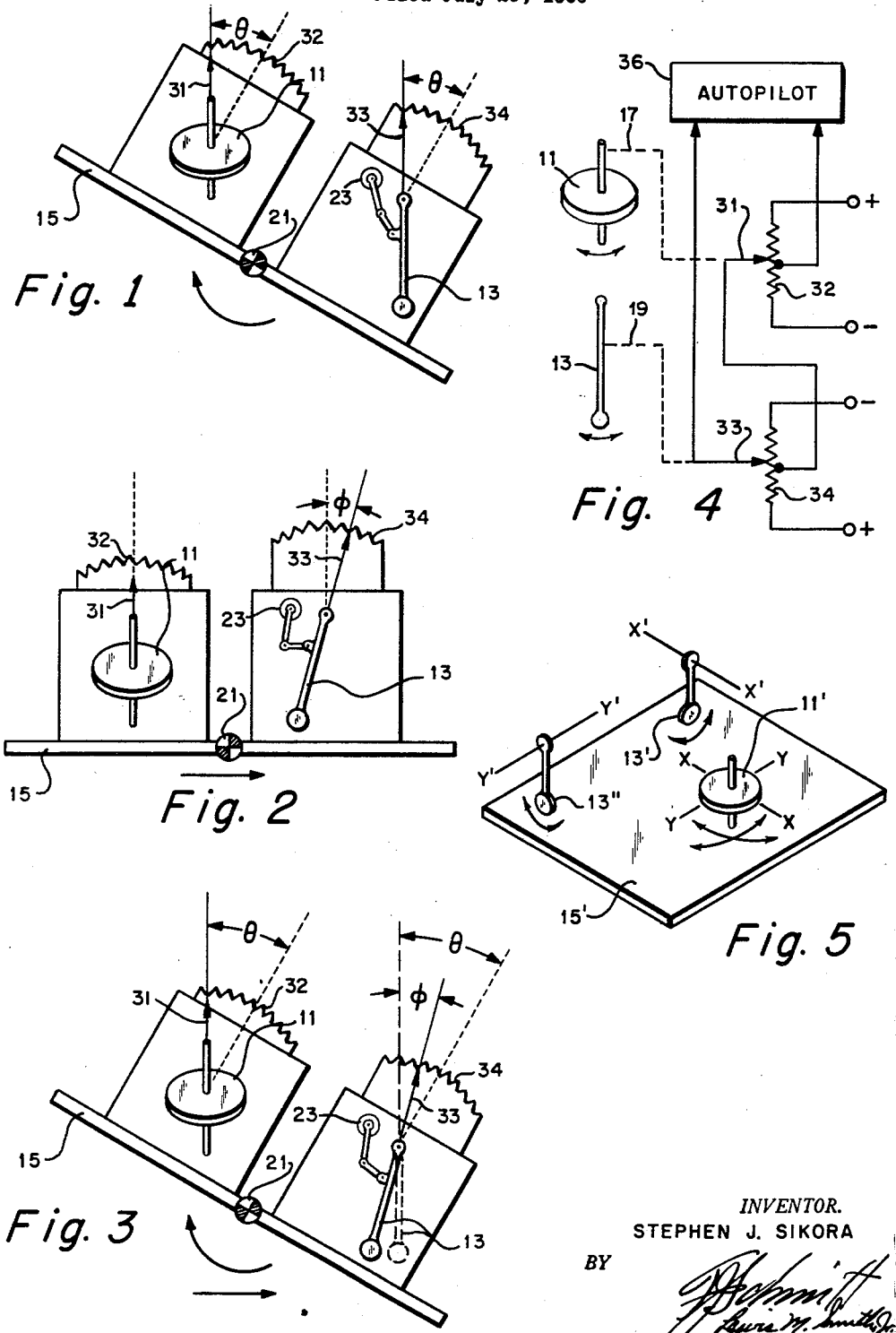

2,942,864
DEVICE FOR MEASURING HORIZONTAL ACCELERATION

Stephen J. Sikora, Philadelphia, Pa., assignor to the United States of America as represented by the Secretary of the Navy Filed July 29, 1955, Ser. No. 525,411

3 Claims. (Cl. 73—493)

(Granted under Title 35, U.S. Code (1952), sec. 266)

The invention described herein may be manufactured and used by or for the Government of the United States of America for governmental purposes without the payment of any royalties thereon or therefor.

This invention relates to a device for measuring horizontal acceleration, and more particularly to a device for measuring horizontal acceleration including means effective to continuously compensate for concurrent angular displacement of the device in order to eliminate in accuracy of the signal obtained due to this angular displacement.

The instant invention is particularly useful for measuring the horizontal acceleration of helicopters wherein the fuselage is generally subjected to anngular displacement due to a change in attitude concurrent with horizontal acceleration thereof. In previous attempts to measure the horizontal acceleration of helicopters, various commercially available accelerometer assemblies were used. However, the results obtained with these existing means for detecting horizontal acceleration were not entirely satisfactory, due to the fact that conventional accelerometer assemblies are designed to produce a signal proportional to the acceleration induced by purely translational movement of the assembly along a horizontal path. Consequently, when such accelerometer assemblies are subjected to angular displacement concurrent with horizontal acceleration, as they are when installed in the fuselage of a helicopter, they produce an erroneous signal including a portion thereof due to the component of gravitational force acting on the mass mounted within the angularly displaced accelerometer, either in addition to or offsetting the desired portion of the signal which is actually representative of the horizontal acceleration to which the accelerometer assembly has been subjected.

The present invention contemplates a device for measuring horizontal acceleration including means, responsive to angular displacement only, arranged to compensate for the error due to angular displacement introduced into the signal generated by this device when it is subjected to a change of attitude about a horizontal axis concurrently with the horizontal acceleration to be measured.

An object of the instant invention is the provision of means for accurately measuring the horizontal acceleration of an object in any direction from a given point.

Another object is to provide a means for measuring horizontal acceleration which is insensitive to concurrent angular displacement of said means.

Still another object is the provision of a device for measuring horizontal acceleration incorporating means operative to continuously compensate for angular displacement of said device about a horizontal axis concurrent with horizontal acceleration thereof.

A final object of this invention is to provide a device for measuring horizontal acceleration including means responsive to angular displacement only and means responsive to both angular displacement and horizontal acceleration operatively interconnected to produce a net signal accurately representative of horizontal acceleration independent of concurrent angular displacement.

Other objects and many of the attendant advantages of this invention will be readily appreciated as the same becomes better understood by reference to the following detailed description when considered in connection with the accompanying drawings wherein:

Fig. 1 illustrates a schematic representation of a preferred embodiment of the instant invention with the respective motion sensing elements thereof shown in the positions which they assume in response to angular displacement of their common supporting structure, Fig. 2 shows the same schematic representation of the instant invention with the respective motion sensing elements thereof in the positions they assume under horizontal acceleration without angular displacement of their common supporting structure, Fig. 3 again shows the same schematic representation of the instant invention with the respective motion sensing elements thereof in the positions they assume in response to the combined effect of angular displacement as illustrated in Fig. 1 and horizontal acceleration as illustrated in Fig. 2, Fig. 4 shows a simplified schematic representation of a suitable circuit by means of which the respective sensing elements of the instant invention may be operatively interconnected to produce the desired output signal, and Fig. 5 illustrates another embodiment of the instant invention suitable for determining the resultant horizontal acceleration in any direction about a given point.

Referring now to the drawings, wherein like reference numerals designate like or corresponding parts, the schematic representation in Fig. 1 includes a vertical gyro assembly 11 and a damped pendulum assembly 13 supported upon a common reference base comprising a rigid structure such as supporting member 15. In one suitable application of the instant invention the assemblies 11 and 13 may be incorporated in the fuselage of a helicopter to measure its horizontal acceleration. In such an application the supporting member 15 would constitute a frame attached to or incorporated in fixed structure within the fuselage of a helicopter, preferably at or close to the center of gravity of the helicopter, represented in Fig. 1 by the symbol 21, to minimize the adverse effect of angular acceleration on the movement of pendulum assembly 13.

In order to function effectively as a device for measuring horizontal acceleration where such a device is simultaneously subjected to angular displacement, the pick-offs 31 and 33 of the respective motion sensing elements 11 and 13 schematically represented in Fig. 1 may be operatively interconnected by any suitable connecting means such as the circuitry schematically illustrated in Fig. 4, in which the pick-off 31, which is connected to and moves with the vertical gyro assembly 11 by means of a suitable mechanical connection 17, is arranged to produce a signal proportional to the angular displacement of the gyro assembly from its null or centered position while pick-off 33, which is connected to and moves with the pendulum assembly 13 by means of a suitable mechanical connection 19, is arranged to produce a signal proportional to the angular displacement of the pendulum assembly. With these pick-offs 31 and 33 electrically interconnected as illustrated in Fig. 4, they produce an output signal accurately representing the horizontal acceleration of the device comprising the instant invention notwithstanding angular displacement of the device about a horizontal axis. When the instant invention is mounted in the fuselage of a helicopter, the signal generated in this manner in response to horizontal acceleration of the helicopter may operate an indicating means only, or preferably, it may be fed directly to the component of the helicopter autopilot 36 operable to control horizontal movement of the helicopter in the direction of the horizontal acceleration measured so that this component of the autopilot is rendered automatically operable to correct or compensate for the conditions causing horizontal acceleration of the helicopter when it is desired to maintain the helicopter in a hovering position automatically under the control of the autopilot. This arrangement is effective for this purpose regardless of the normal changes of attitude of the fuselage of the helicopter which inevitably accompany horizontal acceleration of the helicopter.

The operation of the instant invention can best be described by referring again to the showing in Fig. 1 and to the showings in Fig. 2 and Fig. 3. In Fig. 1, the supporting member 15 is shown tilted from a horizontal position as the result of angular displacement in the direction indicated by the arrow about a horizontal axis which is preferably coincident with or close to the center of gravity, designated by the reference numeral 21, of the body upon which this device is mounted. Such angular displacements of the gyro assembly 11 and the damped pendulum assembly 13 are measured from their null or centered positions, coincident with their respective verticals extending perpendicular to the supporting member 15 and represented in Figs. 1, 2 and 3 by dotted lines. The amount of this angular displacement, common to both assemblies, is designated in Fig. 1 by the angle $\theta$. Fig. 2 illustrates the conditions which exist when the supporting member 15 is subjected to pure translational movement in the direction indicated by the arrow to produce horizontal acceleration resulting in no departure of the gyro assembly 11 from its centered position while the pendulum assembly is angularly displaced about its horizontal axis of rotation by an amount represented by the angle $\phi$, proportional to the horizontal acceleration. The showing in Fig. 3 indicates the positions assumed by the gyro assembly 11 and the pendulum assembly 13 under the combined effect of simultaneous angular displacement and horizontal acceleration in the respective directions indicated by the arrows representing these movements. It will be noted that the gyro assembly 11 is displaced from its centered or null position by the angular amount designated by the angle $\theta$, while the net displacement of the pendulum assembly 13 is the algebraic sum of the displacement $\theta$ due to angular displacement and the displacement $\phi$ due to horizontal acceleration in the direction indicated. In the event of horizontal acceleration in the opposite direction accompanied by a change in attitude as indicated in Fig. 3, the displacement $\phi$ of the pendulum assembly would, of course, be added to rather than subtracted from the displacement $\theta$ thereof.

In order to measure and make use of displacement of the respective assemblies within the device comprising the instant invention suitable pick-offs responsive to movement of the respective assemblies are required along with suitable circuitry interconnecting the respective pick-offs in such a manner that the output therefrom constitutes a signal accurately representative of the horizontal acceleration of this device and independent of its concurrent changes of attitude. Fig. 4 shows a simplified schematic representation of one such arrangement in which a first pick-off 31 movable with the pendulum assembly 13 is displaced along a center tapped potentiometer assembly 32 while a second pick-off 33 movable with the gyro assembly 11 is displaced along a second center tapped potentiometer assembly 34. With the voltage applied as indicated in Fig. 4 across the potentiometer assemblies 32 and 34 and with the pick-offs 31 and 33 mounted for movement with and in the same direction as the gyro assembly 11 and the pendulum assembly 13, respectively, the signal generated by the displacement $\theta$ of the gyro assembly 11 will cancel the signal generated by the equal portion $\theta$ of the displacement of the pendulum assembly 13, leaving a net signal for transmission to a helicopter autopilot which is proportional to the portion $\phi$ of the displacement of the pendulum assembly 13, and, hence, is proportional to the horizontal acceleration of the supporting member 15 of the device comprising the instant invention.

The schematic representation in Fig. 5 illustrates an embodiment of the instant invention especially desirable for incorporation in helicopters because of their inherent capability of horizontal acceleration in any direction. This embodiment takes advantage of the fact that various existing vertical gyro assemblies generally have two pick-offs arranged to sense displacement of the gyro about mutually perpendicular horizontal axes, $x$—$x$ and $y$—$y$. Accordingly, the embodiment shown in Fig. 5 includes two damped pendulum assemblies 13' and 13'', mounted on supporting member 15' for rotation about mutually perpendicular horizontal axes, $x'$—$x'$ and $y'$—$y'$, respectively parallel to axes $x$—$x$ and $y$—$y$. With suitable circuitry such as that shown in Fig. 4 interconnecting the respective pick-offs of the gyro assembly 11' and the respective pendulum assemblies, signals proportional to perpendicular components of the horizontal acceleration are obtained. These signals representing components of of the horizontal acceleration may be combined vectorially by suitable means therefor before they are transmitted to the auto-pilot of a helicopter or they may be transmitted directly to the appropriate components of the autopilot servo system, depending on the configuration of the autopilot, so that the particular autopilot can make use of the information supplied by these signals. When connected to the device comprising the instant invention, the autopilot of a helicopter becomes effective to compensate for undesired horizontal acceleration of the helicopter in any direction from the point at which the helicopter is intended to hover.

A detailed showing of the construction of the gyro assembly and of the damped pendulum assembly has been omitted since both of these components may consist of any one of several well known devices of this type adaptable to this use. In fact, when this device is incorporated in a helicopter equipped with an autopilot, the existing vertical gyro component and its pick-offs may be connected to the other elements of this invention to eliminate the need for an additional vertical gyro assembly without interfering with its normal functions as a component of the autopilot assembly. In addition, the use of the existing vertical gyro component of an autopilot has an added advantage in that such a unit is conventionally provided with an erecting system for vertical stabilization, which otherwise would desirably be provided for gyro assembly 11 in the instant invention to permit most effective utilization of this inventive device. The pendulum assembly may be damped by conventional means such as a dashpot, but such an arrangement results in reduced accuracy due to friction losses. Therefore, it is preferable to use a friction-free damping means which relies for its damping effect on the generation of eddy currents in a conductive non-magnetic material. In a preferred embodiment of this invention the pendulum bob comprises an arcuate segment of aluminum suspended in a magnetic field provided by a suitable electro-magnetic source. Accordingly, the damping means 23 is illustrated in Fig. 1 by a simplified schematic representation. Moreover, since various types of pick-offs are well known, these elements are not illustrated in detail in relation to these assemblies. Instead, the relationship of the pickoffs to the respective motions sensing elements is illustrated in Fig. 1 by a simplified schematic showing, and the pick-offs are represented schematically in Fig. 4 in one suitable circuit for interconnecting the respective components of this device. This circuit may, in fact, be replaced by other suitable circuits for this purpose, well known in the art, such as a synchro system arranged to produce a net signal output of the type described herein.

Obviously, many modifications and variations of the

What is claimed is:

1. A device for measuring the horizontal acceleration of a body upon which it is mounted, continuously compensated for angular displacement of the body concurrent with horizontal acceleration thereof, said device comprising a single supporting base fixedly secured to the body and subject to angular displacement about a horizontal axis substantially coincident with the center of gravity of the body, a first sensing means independently mounted upon said base immediately adjacent to the center of gravity of the body for angular displacement about a horizontal axis in response to both horizontal acceleration and angular displacement of the body, first signal means including potentiometer means responsive to said first sensing means arranged to generate a signal including portions proportional to both horizontal acceleration and angular changes of attitude, a second sensing means independently mounted upon said base responsive solely to changes in attitude of said body about a horizontal axis and second signal means including potentiometer means responsive to said second sensing means arranged to generate a signal proportional to this angular change in attitude, and means operatively interconnecting the potentiometer means of said first signal means and said second signal means in opposed relation, whereby the portion of the signal generated by the first signal means due to changes in attitude is opposed and offset by the signal generated by the second signal means to produce a net signal proportional solely to the horizontal acceleration of the body to which said supporting base is secured.

2. A device for measuring the horizontal acceleration of a body upon which it is mounted, continuously compensated for angular displacement of the body concurrent with horizontal acceleration thereof, said device comprising a single supporting structure fixedly secured to the body and subject to angular displacement about a horizontal axis substantially coincident with the center of gravity of the body, a first sensing means including a damped pendulum independently rotatably mounted upon the supporting structure immediately adjacent to the center of gravity of the body for angular movement about a horizontal axis in response to both horizontal acceleration of the body and changes in attitude of the body about a horizontal axis and a first signal generating means including potentiometer means operable in response to angular movement of the damped pendulum to generate a signal which is a function of both horizontal acceleration and changes in attitude of the body; a second sensing means independently mounted upon the supporting structure and including a vertical gyro assembly with a gyro rotor continuously revolving about a vertical axis independent of changes in attitude of said supporting structure about a horizontal axis and a second signal generating means including potentiometer means operable in response to relative displacement of the gyro rotor and the supporting structure to generate a signal proportional to the change in attitude of the body represented by this relative displacement; and means operatively interconnecting the first and second signal generating means in opposed relation, whereby the portion of the signal generated by the first signal generating means due to changes in attitude is opposed and offset by the signal generated by the second signal generating means to produce a net signal proportional solely to the horizontal acceleration of the body to which the single supporting structure is fixedly secured.

3. A device for measuring the horizontal acceleration of a helicopter fuselage upon which it is mounted, continuously compensated for angular displacement of the helicopter fuselage concurrent with horizontal acceleration thereof, said device comprising a supporting structure fixedly secured to the helicopter fuselage and subject to substantial angular displacement about mutually perpendicular horizontal axes substantially coincident with the center of gravity of the helicopter fuselage; a first motion sensing means including a first damped pendulum rotatably mounted upon the supporting structure immediately adjacent to the center of gravity of the helicopter fuselage for angular displacement about a first horizontal axis in response to both horizontal acceleration and angular displacement of the helicopter fuselage and a first signal generating means including potentiometer means operable in response to angular displacement of the first pendulum to generate a signal which is a direct function of both horizontal acceleration and angular displacement; a second motion sensing means including a second damped pendulum rotatably mounted upon the supporting structure immediately adjacent to the center of gravity of the helicopter fuselage for angular displacement about a second horizontal axis perpendicular to said first horizontal axis in response to both horizontal acceleration and angular displacement of the helicopter fuselage and a second signal generating means including potentiometer means operable in response to angular displacement of said second pendulum to generate a signal which is a direct function of both horizontal acceleration and angular displacement; a third motion sensing means mounted upon said supporting structure including a vertical gyro assembly with the gyro rotor thereof continuously revolving about a vertical axis independent of changes of attitude of the helicopter fuselage and third and fourth signal generating means including potentiometer means operable in response to angular displacement of the gyro relative to the helicopter fuselage about mutually perpendicular axes respectively parallel to said first and said second horizontal axes to generate signals proportional to the angular displacement of the gyro assembly about the respective axes; a first connecting means operatively interconnecting said first and said third signal generating means in opposed relation so that the portion of the signal generated by the first signal generating means due to angular displacement is opposed and offset by the signal generated by the third signal generating means to produce an output signal proportional solely to horizontal acceleration of the helicopter fuselage in a direction perpendicular to said first horizontal axis; and a second connecting means operatively interconnecting said second signal generating means and said fourth signal generating means in opposed relation so that the portion of the signal generated by the second signal generating means due to angular displacement is opposed and offset by the signal generated by the fourth signal generating means to produce an output signal proportional solely to horizontal acceleration of the helicopter fuselage in a direction perpendicular to said second horizontal axis.

References Cited in the file of this patent

UNITED STATES PATENTS

| | | |
|---|---|---|
| 1,727,310 | Klemperer | Sept. 3, 1929 |
| 2,137,974 | Fischel | Nov. 22, 1938 |
| 2,371,626 | Kecskemeti | Mar. 20, 1945 |
| 2,419,063 | Fischer | Apr. 15, 1947 |
| 2,497,614 | Libman | Feb. 14, 1950 |
| 2,519,422 | Agins | Aug. 22, 1950 |
| 2,538,303 | Findley | Jan. 16, 1951 |
| 2,640,900 | Klose | June 2, 1953 |
| 2,672,334 | Chenery | Mar. 16, 1954 |
| 2,770,452 | Miller | Nov. 13, 1956 |

OTHER REFERENCES

Sixth Annual Report, National Advisory Committee for Aeronautics, 1920, Report No. 99, page 484, Report No. 100, pages 500–501.